United States Patent [19]

Reed

[11] Patent Number: 5,415,900

[45] Date of Patent: May 16, 1995

[54] METHOD OF DELIVERING A SUBSTANCE INTO A MATERIAL MASS

[76] Inventor: William C. Reed, 5753 Whistlewood Cir., Sarasota, Fla. 34234

[21] Appl. No.: 180,432

[22] Filed: Jan. 12, 1994

Related U.S. Application Data

[63] Continuation-in-part of Ser. No. 935,697, Aug. 24, 1992, abandoned.

[51] Int. Cl.⁶ .............................................. B05D 3/14
[52] U.S. Cl. ................................. 427/547; 427/230; 427/384; 427/430.1; 427/561; 427/598
[58] Field of Search ............... 427/547, 561, 598, 230, 427/384, 430.1

Primary Examiner—Bernard Pianalto
Attorney, Agent, or Firm—Malloy & Malloy

[57] ABSTRACT

A method of delivering a substance into a material mass including the steps of subjecting a first fluid to a magnetic influence such that the molecules of the first fluid become linearly organized and the first fluid is charged to a positive or negative polarity, introducing the first fluid into the material mass for absorption throughout its interior, subjecting a second fluid to another magnetic influence such that the molecules of the second fluid become linearly organized and the second fluid is charged to a polarity opposite that of the first fluid, and introducing the second fluid into the material mass for absorption therein, whereby the permeability of the fluids into the material mass is greatly enhanced by reason of the linear organization of the fluid molecules, and the naturally attractive forces between the oppositely charged fluids produces a rapid, complete and directed absorption of such polarized fluids throughout the interior of the material mass.

9 Claims, No Drawings

METHOD OF DELIVERING A SUBSTANCE INTO A MATERIAL MASS

This is a continuation-in-part of application Ser. No. 935,697, filed Aug. 24, 1992, now abandoned.

BACKGROUND OF THE INVENTION

1. Field of the Invention

The present invention relates to a method of delivering a substance into a material mass. This is not a mere topical application of the substance to the surface(s) of the material mass but, rather, penetration depth-wise into the mass and beyond the surface(s).

2. Description of the Related Art

Often in many industries such as concrete or metal reinforcement, there is a need to add strengthening chemicals throughout the interior of an object. Unfortunately, adding chemicals throughout the interior of a solid structure such as a concrete wall is often difficult because of the dense nature of the object and, accordingly, often only the exterior portions of the object receive the necessary treatment.

In order to overcome these difficulties and introduce chemicals to the interior of a dense material mass, holes may be drilled to the interior of the object. Drilling holes, however, is not appropriate for many objects, including antique articles or structures, because the holes themselves may reduce the structural integrity of the object, potentially leading to premature decay or detracting significantly from the appearance of the object. Moreover, even if holes are drilled into an object, strengthening chemicals will penetrate only as far as, and to the areas in communication with, the holes. Furthermore, due to the fast reacting nature of many strengthening chemicals, such chemicals are not able to be fully absorbed by the object before hardening.

In addition to industries in which dense objects need to be reinforced, the rapid and/or selective absorption of substances into material masses would be highly beneficial for other uses such as treating wood, deep cleansing material masses, introducing nutrients into plant structures, or any other application which requires rapid and directed absorption of a substance into a material mass.

The delivery method of the present invention is designed precisely to overcome many shortcomings found in existing methods of delivering necessary substances into material masses quickly. The present invention takes advantage of both the unique effects of magnetic induction which it is believed effects a linear molecular organization of a fluid substance to enhance its permeability (i.e., the ability of the fluid substance to penetrate) into a material mass, and the naturally attractive forces between substances which have been polarized to opposite charges by magnetic influences, in order to achieve rapid and complete penetration and absorption of such fluid substances into material masses of varying densities.

The purpose and function of magnetic inducement in the present invention is specifically directed to the rearrangement of fluid molecules from an agglomerated state to a more linear and organized state. As a result of this linear molecular organization produced by a magnetic influence, the fluid's permeability into a material mass is greatly enhanced, and penetration of the fluid through the surface and periphery of the material mass occurs much more readily than if the fluid's molecular organization had remained in an agglomerated state.

The magnetic influence utilized in the present invention not only makes the fluid more permeable by effecting a linear organization of its molecules, which is a critical feature of the present invention, but also serves to facilitate the assimilation of such fluids throughout the interior of the material mass. This is accomplished by polarizing two fluids to opposite charges with magnetic influences of opposite polarities. As a result, the naturally attractive forces between the oppositely charged fluids increases the rate of absorption of the second fluid to be introduced into the material mass and ensures that the absorption of this second fluid is directed throughout the interior of the material mass.

An additional advantage of fluid polarization effected by a magnetic influence instead of electrostatic means is that the positive polarity of the fluid molecules will be increased, thereby increasing the spaces between the individual fluid molecules through greater repellency. As a result of this increased positive polarity, the fluid molecules are separated to a greater extent so that the molecules are able to penetrate individually, rather than collectively, into a given material mass, thereby significantly enhancing the permeability of the fluid.

In addition, because fluid molecules positively charged by a magnetic influence become more separated, chemically reactive agents that are added to the fluids (which serve as carrier vehicles) attain a more uniform distribution amongst the fluid molecules. After the carrier fluids and chemically reactive agents therein are introduced into the material mass, the more uniform dispersion of the chemical agents in the carrier fluids results in an acceleration of the normal reaction time of such chemically reactive agents within the interior of the material mass.

U.S. Pat. No. 3,919,437 to Brown et al. discloses a method and apparatus for impregnating multi-filament strands in which impregnating particles are charged to one polarity, and the individual fibers or filaments of the strand are charged to an opposite polarity, in order to cause the particles to be attracted and adhere to the individual fibers of the strand, i.e., topical application to the filament surfaces of the strand, some of which filament surfaces are exteriorly accessible along the strand and the accessibility of the filament surfaces may be enhanced as by partially unwinding a twisted bundle of filaments comprising a strand. Brown utilizes electrostatic generating means to charge the impregnating particles and strand fibers to opposite polarities. The purpose and result of the polarization created by the Brown process is solely to produce a mutual electrostatic attraction and bond between the oppositely charged impregnating particles and individual fibers of the strand such that the particles impregnate the strand by contacting and adhering to the surface of each individual fiber thereof. The method of the Brown invention is intended to provide a topical application of the impregnating particles onto the individual fibers for coating the surfaces thereof, and acts upon a multi-filament strand that is not a unified solid structure but rather a plurality of separable individual filaments. The Brown patent does not disclose that its method produces a penetration of charged particles through the surface and into the interior of the individual fiber structures themselves. Moreover, the Brown patent neither teaches nor suggests that its method is intended to accomplish, or capable of accomplishing, a result other than a mere topical coating of the impregnating particles onto the surfaces of the individual fibers.

In contrast, the method of the present invention in intended to deliver a substance into the interior, and not just onto the surface, of a material mass. The present invention utilizes a magnetic influence not merely as a substitute for an electrostatic means to charge fluid substances to opposite polarities, but as a means of effecting a linear organization and separation of the fluid molecules so as to greatly enhance the fluids' permeability through the surface and into the interior of a dense material mass such as a concrete structure. From the disclosure of the Brown patent, it is apparent that its method would not work on a solid concrete structure or similar material mass to create the necessary penetration of a substance into the interior of such a mass for assimilation throughout the interior of that mass. The method of the present invention, however, is intended and able to operate not merely upon the exterior surface of a structure such as the surface of a filament but rather to penetrate to the interior of a given mass for complete assimilation therethrough.

SUMMARY OF THE INVENTION

The present invention is directed towards a method of delivering a substance into a material mass. Initially, a first fluid be subjected to a magnetic influence such that it attains a positive or negative charge and its molecules become linearly organized. Next, the first fluid is introduced to the surface of the material mass for penetration therein and complete absorption throughout the interior of the mass. A second fluid is then subjected to another magnetic influence to polarize it to a charge opposite that of the first fluid and to linearly organize its molecules. Finally, this second fluid is introduced to the surface of the material mass for penetration therein, resulting in a rapid and directed absorption of the second fluid throughout the interior of the material mass by reason of the naturally attractive force between oppositely charged fluids.

It is an object of the present invention to provide a method of delivering a substance into a material mass which includes an enhanced permeability of the substance through the surface of the material mass and a rapid and complete absorption of the substance within the interior of the material mass, without the need to create openings in the mass through which the substance must be introduced.

Still another object of the present invention is to provide a method of delivering a substance into a material mass which enables two reactive substances to react completely within the interior of a material mass, rather than only along the periphery of the material mass due to a slow rate and/or incomplete absorption of the reactive substances.

A further object of the present invention is to provide a method of delivering a substance into a material mass which enables directed delivery of the substance to the interior of the material mass.

DETAILED DESCRIPTION OF THE PREFERRED EMBODIMENT

The preferred embodiment of the method of the present invention provides for the delivery of strengthening chemicals into a solid mass such as a concrete structure in order to substantially increase the compressive strength of the concrete as a means of reinforcing the structure. The method includes subjecting a first carrier fluid, such as water, to a magnetic influence for the purposes of polarizing the water to a positive or negative charge and rearranging the water molecules from an initial agglomerated state to a more linear and organized state. To accomplish this, the water may be passed through an apparatus such as a magnetically conductive pipe in which positively or negatively polarized magnets of specific design and orientation are placed. The magnetic influence may be achieved utilizing the monopole permanent magnet method developed by Peter Kulish in 1979, employing a magnetizing device such as that disclosed in U.S. Pat. No. 4,605,498.

A first proprietary additive, in this case a chemically reactive strengthening agent, is then added to the water and mixed therewith. Next, the solution of water and strengthening agent is introduced to the surface of the concrete structure, where, as a result of the linear organization of the water molecules, the solution's permeability therein is greatly enhanced. After the solution penetrates into the concrete structure, it is absorbed through the open capillaries of the structure and assimilated throughout the interior thereof.

Once complete absorption of the solution of water and strengthening agent into the material mass has taken place, a second carrier fluid is similarly subjected to another magnetic influence that charges such fluid to a polarity opposite that of the water. A second proprietary additive, specifically a second strengthening agent that will chemically react with the first agent to produce a hardening of the concrete, is then added to and mixed with the second carrier fluid. This solution of the second carrier fluid and second strengthening agent is then introduced to the surface of the concrete structure and allowed to penetrate into and be fully absorbed within the concrete structure. Because the water and the second carrier fluid have been polarized to opposite charges, the second carrier fluid will be drawn throughout the interior of the concrete structure at a quicker rate than normal absorption would occur, due to the naturally attractive forces between oppositely charged substances. In addition, the assimilation of the second carrier fluid solution will be specifically directed towards the solution of water and first strengthening agent within the interior of the structure. After the second carrier fluid has been completely absorbed within the interior of the concrete structure, the strengthening agents contained in the water and second carrier fluid will react with one another throughout the internal sections of the structure where strengthening is needed most, thereby producing a substantial reinforcement of the concrete structure.

It can be readily understood that there are a broad range of potential uses of the preferred embodiment of the method of the present invention. For example, this method can be used on metal objects, such as artifacts which have been salvaged from the ocean and become greatly weakened from long exposure to the seawater, making them susceptible to disintegration if exposed to normal environmental conditions outside of the water. For use on such metallic objects, the appropriate proprietary additives are added to the carrier fluids, and in accordance with the present invention, delivered directly to the interior of the object to effect the necessary reinforcement of its structure. Another use of this method would be to introduce chemicals into an object that is generally exposed to the elements for the purpose of sealing the object to make it substantially waterproof.

In an alternative embodiment of the present method, the object to be treated may itself be polarized. Ideally, it is the interior sections of the object which should be polarized, thereby making it preferable to introduce into the object a first fluid which has been polarized to a positive or negative charge. For example, this alternative embodiment can be used in agricultural applications, wherein a first fluid such as water that has been subjected to a magnetic influence is allowed to be absorbed by a living plant structure. After the assimilation of the water into the plant structure, its interior sections will attain the same charge to which the water has been polarized. A second, oppositely charged fluid containing nutrients is subsequently introduced into the plant structure, resulting in a rapid and complete absorption of the second fluid and nutrients therein throughout the interior of the plant at a greatly increased rate.

The method of the present invention, therefore, has numerous applications where a substance must be delivered into a material mass quickly and specifically directed. Since many modifications, variations, and changes in detail can be made to the described preferred embodiment of the invention, it is intended that all matters in the foregoing description be interpreted as illustrative and not in a limiting sense. For example, the fluids that are subjected to the magnetic influences for subsequent introduction into the material mass may be the proprietary additives themselves if such additives are in fluid form, thereby eliminating the need for separate carrier fluids. Thus, the scope of the invention should be determined by the appended claims and their legal equivalents.

What is claimed is:

1. A method of delivering a substance into a material mass comprising the steps of:
   a) subjecting a first fluid to a magnetic influence for polarizing said first fluid to a first charge and affecting the organization of the molecules of said first fluid;
   b) introducing said first fluid to a surface of said material mass for penetrating therein and absorbing of said first fluid within the interior of said material mass;
   c) subjecting a second fluid to a second magnetic influence for polarizing said second fluid to a charge opposite that of said first fluid and affecting the organization of the molecules of said second fluid;
   d) introducing said second fluid to a surface of said material mass for penetrating therein and absorbing of said second fluid within the interior of said material mass, whereby said second fluid is attracted to said first fluid within the interior of said material mass.

2. A method of delivering a substance into a material mass as recited in claim 1, further comprising the step of adding a first chemical compound to said first fluid prior to introducing said first fluid to a surface of said material mass.

3. A method of delivering a substance into a material mass as recited in claim 2, further comprising the step of adding a second chemical compound to said second fluid prior to introducing said second fluid to a surface of said material mass, said second chemical compound having the property of being chemically reactive with said first chemical compound, whereby said second chemical compound will react with said first chemical compound within the interior of said material mass.

4. A method of delivering a substance into a material mass as recited in claim 1 wherein said first charge is positive.

5. A method of delivering a substance into a material mass as recited in claim 1 wherein said first charge is negative.

6. A method of delivering a substance into a material mass comprising the steps of:
   a) subjecting said material mass to a magnetic influence for polarizing the interior thereof to a first charge;
   b) subjecting a fluid to a magnetic influence for polarizing said fluid to a charge opposite that of said material mass interior and affecting the organization of the molecules of said fluid; and
   c) introducing said fluid to a surface of the material mass for penetrating therein and absorbing of said fluid within the interior of said material mass, whereby said fluid is attracted to the oppositely charged interior of said material mass.

7. A method of delivering a substance into a material mass as recited in claim 6, wherein the step of polarizing said material mass further comprises the steps of subjecting another fluid to a magnetic influence for polarizing said other fluid to the first charge that it is desired said material mass interior attain and affecting the organization of the molecules of said other fluid, and introducing said other fluid to a surface of said material mass for penetrating therein and absorbing of said fluid within the interior of said material mass, whereby the interior of said material mass is polarized to the first charge.

8. A method of delivering a substance into a material mass as recited in claim 6 wherein said first charge is positive.

9. A method of delivering a substance into a material mass as recited in claim 6 wherein said first charge is negative.

* * * * *